UNITED STATES PATENT OFFICE.

JULIUS STOCKHAUSEN, OF CREFELD, GERMANY.

PROCESS FOR THE PRODUCTION OF A PLASTIC OR ELASTIC SUBSTANCE.

1,061,881. Specification of Letters Patent. Patented May 13, 1913.

No Drawing. Application filed May 4, 1911. Serial No. 625,083.

*To all whom it may concern:*

Be it known that I, JULIUS STOCKHAUSEN, a subject of the German Emperor, residing at Crefeld, Germany, have invented a new and useful Process for the Production of a Plastic or Elastic Substance; and I do hereby declare the following to be a full, clear, and exact description of the same.

This invention has for object to produce an elastic or plastic substance from gelatin, which looks exactly similar to india rubber, and may be molded, rolled, pressed, shaped and otherwise worked. This technical improvement is obtained essentially by treating solid or liquid gelatin with camphor in the solid or liquid (dissolved) state, at ordinary or preferably at comparatively high temperature. The gelatin should contain only so little water and should be mixed with so much camphor that a rubber-like substance is obtained.

The invention resides primarily in the fact that the camphor is used as such, *i. e.* free of combination with nitro-cellulose and similar substances. The camphor used is the ordinary commercial camphor. The claims are to be considered in the light of the foregoing. The product so obtained may be considerably improved by the further addition of glycerin or similar solvents, of filling materials of any kind, of wood-pitch, wood tar, oils, fats, resins, turpentine, also of india rubber in solution or in the solid, as well as by hardening with the usual hardening agents and by vulcanizing. The addition may be made before, at the time as and together with or after the addition of camphor. The hardening may be carried out before or after the addition of camphor.

*Examples:*

I. 125 grams of powdered gelatin are dissolved in 125 grams of crude glycerin, 28° Bé, at about 70° C. Then there are added 15 grams of tar and 20 grams of camphor which is dissolved in 15 grams of acetone. Finally 15 grams of 4% formaldehyde are used for hardening. After very careful and thorough mixing, the substance can be poured into molds.

II. 125 grams of powdered gelatin are dissolved in 125 grams of glycerin, as before. Then 15 grams of wood-tar and 20 grams of camphor which is dissolved in 10 grams of acetone, and lastly 30 grams of flowers of sulfur are added. 15 grams of 4% formaldehyde are used for hardening. To obtain better mixing, the substance may be passed through mixing rollers or a suitable mill. After the substance has been sufficiently stirred or rolled, it may be vulcanized in molds at about 110° C. and under suitable pressure.

III. 100 grams of powdered gelatin are dissolved in 125 grams of glycerin, as before, and 30 grams of camphor dissolved in 15 grams of acetone are added. After treatment in a mill, the material is thoroughly mixed with 35 grams india rubber. 10 grams of tannin are used for hardening. The material may be pressed in molds.

IV. 100 grams of gelatin powder are dissolved in 130 grams of crude glycerin of 28° Bé, as above. 30 grams of camphor dissolved in 15 grams of acetone and 30 grams of flowers of sulfur are added. After treatment in a mixing mill, this is mixed with 35 grams of india rubber, 20 grams of 4% formaldehyde. The material is vulcanized at about 110° C, as in the case of ordinary rubber mixings.

Having thus fully described my invention, what I claim is—

1. The process of producing an india-rubber substitute comprising mixing gelatin with glycerin and with camphor, said camphor being dissolved in acetone.

2. The process of producing an india-rubber substitute comprising mixing gelatin with glycerin, wood-pitch and camphor, said camphor being dissolved in acetone.

3. The process of producing an india-rubber substitute comprising mixing gelatin with glycerin and with camphor, and treating the mass with sulfur.

4. The process of producing an india-rubber substitute comprising mixing gelatin with glycerin and with camphor, said camphor being dissolved in acetone, and treating the mass with sulfur.

5. The process of producing an india-rubber substitute comprising mixing gelatin with glycerin, wood-pitch and camphor, and treating the mass with sulfur.

6. The process of producing an india-rubber substitute comprising mixing gelatin with glycerin, wood-pitch and camphor, said camphor being dissolved in acetone, and treating the mass with sulfur.

7. As a new composition of matter, an india-rubber substitute comprising gelatin, glycerin, camphor and acetone.

8. As a new composition of matter, an india-rubber substitute comprising gelatin, glycerin, camphor, acetone and wood-pitch.

9. As a new composition of matter, an india-rubber substitute comprising gelatin, glycerin, camphor and sulfur.

10. As a new composition of matter, an india-rubber substitute comprising gelatin, glycerin, camphor, acetone and sulfur.

11. As a new composition of matter, an india-rubber substitute comprising gelatin, glycerin, camphor, wood-pitch and sulfur.

12. As a new composition of matter, an india-rubber substitute comprising gelatin, glycerin, camphor, acetone, wood-pitch and sulfur.

In testimony whereof, I have signed my name to this specification in the presence of two subscribing witnesses.

JULIUS STOCKHAUSEN.

Witnesses:
 HENRY QUADFLIEG,
 W. J. REUTERS.